United States Patent
Marson et al.

(10) Patent No.: US 12,013,751 B2
(45) Date of Patent: Jun. 18, 2024

(54) GENERATING A TARGET DATA BASED ON A FUNCTION ASSOCIATED WITH A PHYSICAL VARIATION OF A DEVICE

(71) Applicant: Cryptography Research, Inc., San Jose, CA (US)

(72) Inventors: Mark Evan Marson, Carlsbad, CA (US); Scott C. Best, Palo Alto, CA (US); Helena Handschuh, Palo Alto, CA (US); Winthrop John Wu, Pleasanton, CA (US)

(73) Assignee: Cryptography Research, Inc., San Jose, CA (US)

( * ) Notice: Subject to any disclaimer, the term of this patent is extended or adjusted under 35 U.S.C. 154(b) by 338 days.

(21) Appl. No.: 16/972,560

(22) PCT Filed: Jun. 5, 2019

(86) PCT No.: PCT/US2019/035627
§ 371 (c)(1),
(2) Date: Dec. 4, 2020

(87) PCT Pub. No.: WO2019/241007
PCT Pub. Date: Dec. 19, 2019

(65) Prior Publication Data
US 2021/0271542 A1    Sep. 2, 2021

Related U.S. Application Data

(60) Provisional application No. 62/683,483, filed on Jun. 11, 2018.

(51) Int. Cl.
*G06F 11/10* (2006.01)
*H04L 9/08* (2006.01)
*H04L 9/32* (2006.01)

(52) U.S. Cl.
CPC ............ *G06F 11/10* (2013.01); *H04L 9/0866* (2013.01); *H04L 9/3278* (2013.01)

(58) Field of Classification Search
USPC ........................................... 714/752
See application file for complete search history.

(56) References Cited

U.S. PATENT DOCUMENTS

| 8,610,454 B2 | 12/2013 | Plusquellic et al. |
| 8,983,067 B2 | 3/2015 | Murray |

(Continued)

FOREIGN PATENT DOCUMENTS

| JP | 2012-519987 A | 8/2012 |
| WO | WO-2016-058793 A1 | 4/2016 |
| WO | WO-2016-102164 A1 | 6/2016 |

OTHER PUBLICATIONS

Merli, Dominik et al, "Protecting PUF Error Correction by Codeword Masking", IACR Cryptology ePrint Archive, pp. 334-349, May 2013. [retrieved on Aug. 2, 2019]. Retrieved from the Internet: <URL: https://pdfs.semanticscholar.org/a037/c8de695e6371a8c0ce1defb3197b7090f089.pdf>; entire document. 16 Pages.

(Continued)

*Primary Examiner* — James C Kerveros
(74) *Attorney, Agent, or Firm* — Lowenstein Sandler LLP

(57) ABSTRACT

A value corresponding to a physical variation of a device may be received. Furthermore, helper data associated with the physical variation of the device may be received. A result data may be generated based on a combination of the value corresponding to the physical variation of the device and the helper data. An error correction operation may be performed on the result data to identify one or more code words (Continued)

associated with the error correction operation. Subsequently, a target data may be generated based on the one or more code words.

20 Claims, 7 Drawing Sheets

(56) References Cited

U.S. PATENT DOCUMENTS

| | | | |
|---|---|---|---|
| 2012/0072737 A1* | 3/2012 | Schrijen | G06F 7/588 |
| | | | 713/189 |
| 2013/0051552 A1* | 2/2013 | Handschuh | H04L 9/0897 |
| | | | 380/44 |
| 2014/0325237 A1 | 10/2014 | Van Der Leest et al. | |
| 2015/0234751 A1 | 8/2015 | Van Der Sluis et al. | |
| 2016/0227348 A1* | 8/2016 | Guo | H04W 12/086 |
| 2017/0021254 A1 | 2/2017 | Maes et al. | |
| 2017/0155389 A1* | 6/2017 | Zhao | H03K 19/0005 |
| 2018/0219669 A1* | 8/2018 | Chen | H04L 9/0891 |

OTHER PUBLICATIONS

Notification of Transmittal of the International Search Report and the Written Opinion of the International Searching Authority, or the Declaration dated Aug. 29, 2019 re: Int'l Appln. No. PCT/US19/035627. 38 pages.

EP Extended European Search Report dated Feb. 24, 2022 re: EP Appln. No. 19819599.2. 21 pages.

EP Response filed on Sep. 21, 2022 in Response to the Extended European Search Report dated Feb. 24, 2022 and the Official Communication Pursuant to Rules 70(2) and 70a(2) EPC dated Mar. 15, 2022 for EP Appln. No. 19819599.2. 27 pages.

JP Office Action dated Mar. 29, 2023 re: JP Appln. No. 2020-544757. 7 pages (w/translation).

\* cited by examiner

GENERATING A TARGET DATA BASED ON A FUNCTION ASSOCIATED WITH A PHYSICAL VARIATION OF A DEVICE

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
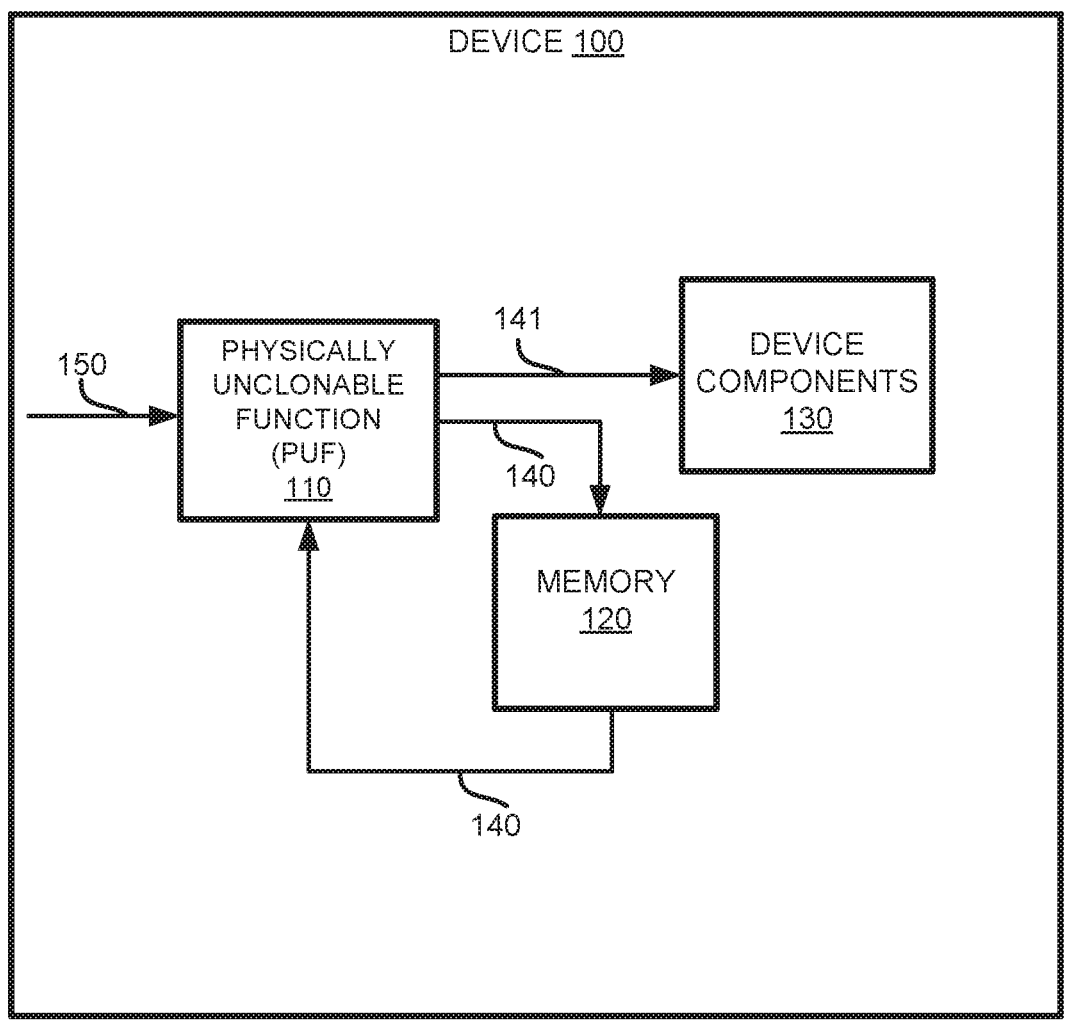
FIG. 1 illustrates an example device including a physically unclonable function in accordance with some embodiments of the present disclosure.

Aspects of the present disclosure are directed to generating a target data based on a function associated with a physical variation of a device. In general, a semiconductor device may include physical variations as a result of the semiconductor fabrication process of the semiconductor device. The physical variations may be unique to a particular semiconductor device. For example, the physical variation may be a unique hardware characteristic or behavior of the semiconductor device. The physical variation may be randomly introduced to the semiconductor device as part of the semiconductor fabrication process. Such a physical variation in a semiconductor device may be associated with a physically unclonable function (PUF) that generates a value that is representative of the physical variation.

The physically unclonable function may be used to generate a target data that is used to perform operations at a device. For example, the PUF may correspond to an unpredictable or unknown but constant value for a particular semiconductor device. The value corresponding to the PUF may be used to generate a target data such as a secret cryptographic key to be used by the device. Such a cryptographic key may be common among multiple other devices. Since the value corresponding to the different PUFs in different devices may be unknown and unpredictable, additional data (i.e., helper data) may be used to facilitate the generation of the expected target data when using the value corresponding to the PUF for each of the devices. For example, the helper data may be used to determine which values corresponding to the PUF should be selected and used to generate the target data. As a result, the combination of the corresponding helper data and the value corresponding to the PUF may be used to generate the same target data for each of the devices when the value corresponding to the PUF may be different between the devices.

As an example, the PUF may correspond to physical variation in a static random access memory (SRAM) where particular bits of the SRAM may be biased towards a value of '0' or a value of '1' at an initialization of a device that includes the SRAM. The helper data may identify which particular biased bits of the SRAM should be selected and used as the value corresponding to the PUF that are used to generate the target data. The helper data may be generated by the PUF after the values corresponding to the PUF are selected and the helper data may be stored in a memory. Subsequently, the helper data may be retrieved from the memory and provided to the PUF at a later time so that the corresponding values of the PUF may be selected to generate the same target data. As a result, the helper data may be used to select particular bits of a repeatable but random value of the PUF to generate the target data.

The use of the value corresponding to the PUF (i.e., the PUF value) may result in an exporting of the PUF value during the manufacturing of a device that includes the PUF. Furthermore, the use of the value corresponding to the PUF may be used in an additional operation (e.g., to encrypt a cryptographic key with the value corresponding to the PUF). However, such exporting of the PUF value during the manufacturing of the device or the use of the PUF value in an additional operation may expose the PUF value so that an unauthorized entity may retrieve the PUF value and compromise the security of the device. For example, if the PUF value is used to generate a cryptographic key to be used by the device, then the cryptographic key may be retrieved or generated by the unauthorized entity after the PUF value has been exported.

Aspects of the present disclosure address the above and other deficiencies by utilizing a PUF corresponding to physical variations in, for example (but not limited to), SRAM. For example, code words used in an SRAM error correction operation may be generated based on values of a target data and random numbers. In general, the helper data may further be a combination of the target data and the code words that are based on the values of the target data and the random numbers. Subsequently, the helper data may be used to generate the target data. For example, the output of the PUF may be received and combined with the helper data. An error correction operation may be performed on the combination of the output of the PUF and the helper data to generate code words. Subsequently, the code words may be used to determine the corresponding target data.

Advantages of the present disclosure include, but are not limited to, an improved security in the target data. For example, since the value of the PUF is not exported and thus less likely to be retrieved by an unauthorized entity, the target data that is generated based on the value of the PUF may be considered to be more secure than when the value of the PUF is exported. Thus, the operations of a device that uses the PUF to generate a target data corresponding to a cryptographic key when performing the operations may be more secure. Furthermore, a device manufactured for a first customer may be programmed at manufacture to generate a first target value while devices manufactured for a second customer may be programmed to generate a second target value.

FIG. 1 illustrates an example device 100 including a physically unclonable function. The device 100 may include an integrated circuit where a portion of the integrated circuit is associated with a physical variation corresponding to the physically unclonable function that is used to generate a target data. In general, the physically unclonable function may be a circuit that corresponds to, but is not limited to, a static random access memory (SRAM) PUFs (which rely on random voltage offsets), timing PUFs (which rely on unpredictable race conditions), impedance PUFs (which rely on resistance, capacitance or inductance mismatch), etc. Such PUF circuits may utilize helper data that is stored in a non-volatile memory to achieve long-term stability of the output of the PUF circuit (e.g., the PUF value).

As shown in FIG. 1, the device 100 may include the physically unclonable function 110, a memory 120, and device components 130. The memory 120 may be a non-volatile memory of the device and the physically unclonable function 110 may correspond to an integrated circuit or a structure or portion of an integrated circuit. Furthermore, the device components 130 may be circuitry that performs functionality associated with a cryptographic operation. For example, the cryptographic operation may be to encrypt and/or decrypt input data by using a target data that is generated by using the physically unclonable function 110.

The physically unclonable function 110 may generate a target data 141 based on a physical variation of the PUF 110 and helper data 140 from the memory 120. For example, the physically unclonable function 110 may receive a target data 150. In some embodiments, the target data 150 may be an intended cryptographic key for a class of devices. For example, the target data 150 may be a cryptographic class key that is intended to be used or generated by each device (e.g., the device 100 and other devices) in the class of devices. After receiving the target data 150, the physically unclonable function 110 may generate helper data 140 based on the target data 150 and values corresponding to the physical variation associated with the physically unclonable function 110. In some embodiments, the physical variation of the physically unclonable function 110 may correspond to multiple values. For example, a first value may correspond to a first physical variation in the structure of the physically unclonable function 110 and a second value may correspond to a second physical variation in the structure of the physically unclonable function 110. In some embodiments, if the physically unclonable function 110 corresponds to an SRAM, then the first physical variation may correspond to whether a first bit of the SRAM is more biased towards a value of '0' or a value of '1' at initialization or startup of the device 100 and the second physical variation may correspond to whether a second bit of the SRAM is more biased towards a value of '0' or a value of '1' at initialization or startup of the device 100. Thus, different physical variations in the structure of the physically unclonable function 110 may each correspond to a different bit that may be used to generate the target data 150. The helper data 140 may identify which particular bits corresponding to the different physical variations of the physically unclonable function 110 should be selected and used to generate the received target data 150 or may be used to generate the received target data 150.

As an example, the target data 150 may be a value of '00110.' The physically unclonable function 110 may provide values '001111111110' as a result of its different physical variations. The helper data 140 may identify that the first four bits '0011' and the last bit '0' should be selected from the physically unclonable function 110 to generate the target data 150. Since the helper data includes information corresponding to a utilization of certain bits or other such information, then the information from the helper data alone does not reveal the desired target value to an attacker or other such unauthorized entity that is able to obtain the helper data. In the same or alternative embodiments, the helper data may include additional information, such as the first four bits may be selected without being modified and then the fifth bit may be selected and inverted or performed with another type of modification. In some embodiments, if the physically unclonable function 110 corresponds to an SRAM, then the helper data 150 may correspond to code words and the output of the physically unclonable function 110 as described in further detail below.

Referring to FIG. 1, the helper data 140 may be stored in the memory 120 after being generated by the physically unclonable function 110. Subsequently, the device components 130 may request that the target data 150 be provided. In response, the helper data 140 may be provided to the physically unclonable function 110 to generate the subsequent target data 141 that may match the original target data 150 that was used to generate the helper data 140. In some embodiments, the subsequent target data 141 may correspond to a cryptographic key to be used by the device components 130 or a value that is used to generate the cryptographic key.

Figure 2:
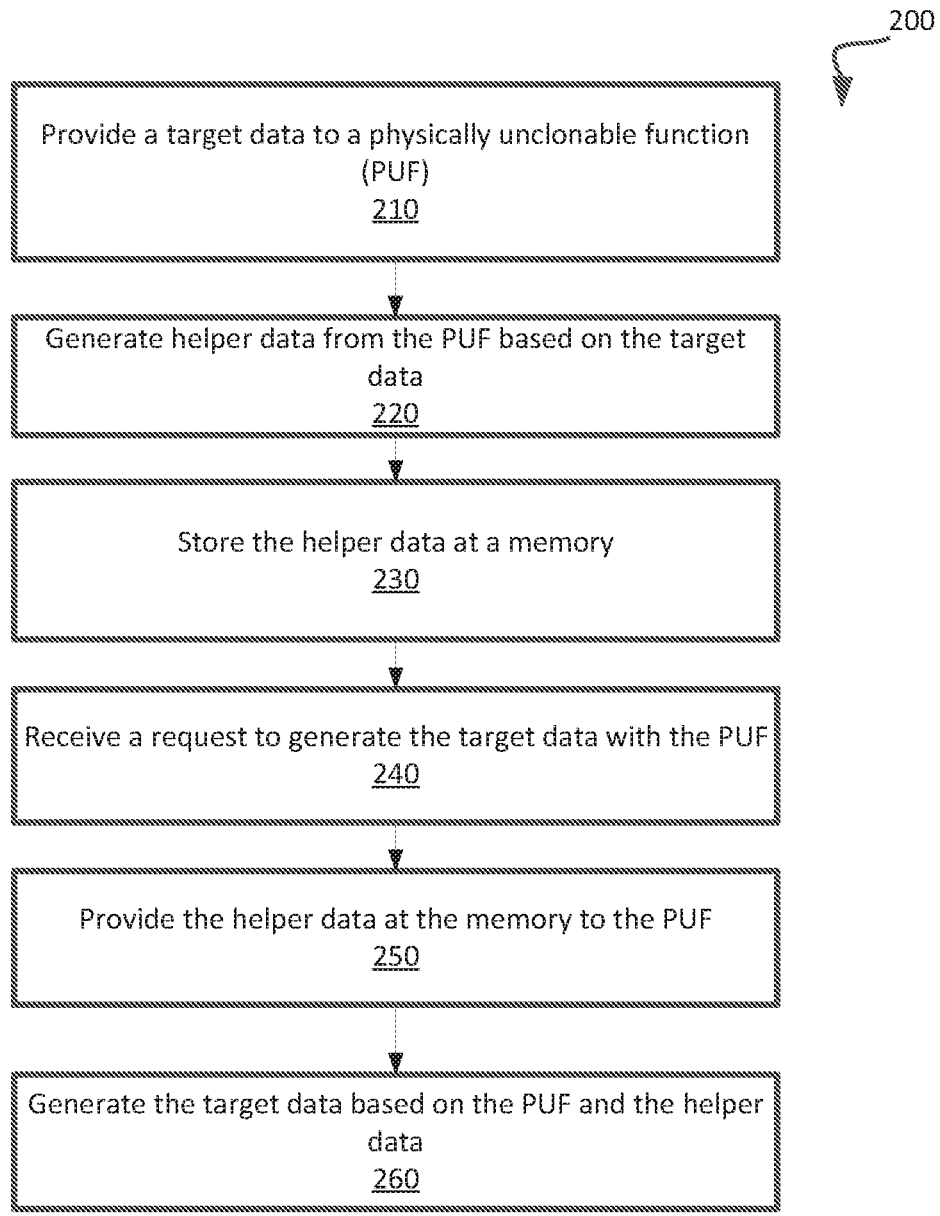
FIG. 2 is a flow diagram of an example method to generate helper data and a target data by using a physically unclonable function in accordance with some embodiments.

FIG. 2 is a flow diagram of an example method 200 to generate helper data and a target data by using a physically unclonable function. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the physically unclonable function 110 and/or other device components 130 of the device 100 of FIG. 1.

As shown in FIG. 2, the method 200 may begin, at block 210, with the processing logic providing a target data to a physically unclonable function (PUF). For example, a cryptographic key that is intended to be replicated at a later time may be provided to the PUF. The processing logic may further generate helper data from the PUF based on the target data (block 220). For example, the helper data may provide additional data to reproduce the target data by using the values from the PUF and/or identify particular bits corresponding to the physical variations of the PUF that should be selected and used to replicate the target data as an output value of the PUF. In some embodiments, the PUF may correspond to an SRAM and the helper data may be a combination of an output value of the PUF and code words. Further details with regards to the generation of the helper data are described in conjunction with FIGS. 3A and 3B. Subsequently, the processing logic may store the helper data at a memory (block 230). The helper data may be stored at the memory for subsequent retrieval to generate the target data at a later time. The processing logic may further receive a request to generate the target data with the PUF (block 240). For example, the request to generate the target data may be received after the helper data has been generated and stored at the memory. The request to generate the same target data may be in response to a request from a device component for a cryptographic key corresponding to the target data that is to be used in an operation by the device component. The processing logic may provide the helper data at the memory to the PUF (block 250). For example, the helper data that was previously generated by the PUF based on the previously received target data may be provided to the PUF at a later time. The processing logic may subsequently generate the target data based on the PUF and the helper data (block 260). For example, the helper data may be used to generate or select values corresponding to the PUF that reflect the previous target data that was received by the PUF and used to generate the helper data. In some embodiments, the helper data may be combined with the output of the PUF to produce a result where error correction is performed on the result to retrieve code words. Furthermore, the code words may be used to derive or generate the target data. Further details with regards to generating the target data from the code words are described in conjunction with FIGS. 4A and 4B. The code words may be error correcting codes that are used in an error correction operation.

As such, physical variations of the circuitry of the device (e.g., the PUF) may represent multiple bits or values. The helper data may be used to identify a subset of the bits or values represented by the physical variations and/or additional data (e.g., code words) that are used in conjunction with the bits or values represented by the physical variations to generate the target data. For example, the helper data may identify a particular number and an ordering of the bits represented by the physical variations and code words to be used with an error correction operation so that the number and ordering corresponds to or is the target data after the performing of the error correction operation.

Figure 3A:
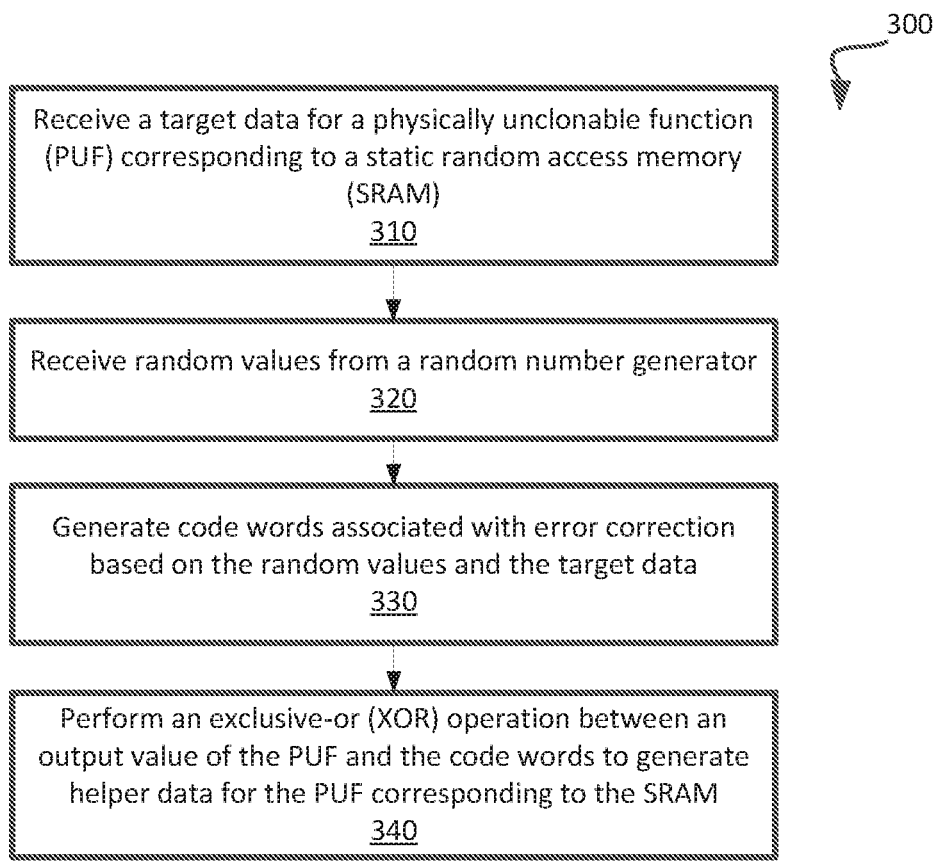
FIG. 3A is a flow diagram of an example method to generate helper data for a physically unclonable function in accordance with some embodiments of the present disclosure.

FIG. 3A is a flow diagram of an example method 300 to generate helper data for a physically unclonable function. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the physically unclonable function 110 and/or other device components 130 of the device 100 of FIG. 1.

The method 300 may correspond to the generation of helper data for a PUF that corresponds to an SRAM. As shown in FIG. 3A, the method 300 may begin, at block 310, with the processing logic receiving a target data for a physically unclonable function that corresponds, in this example, to a static random access memory (SRAM). In other embodiments, the PUF may correspond to any other type of PUF circuit that utilizes helper data to ensure stability (for example, but not limited to, voltage-offset-based PUFs, timing-based PUFs or impedance-based PUFs). The processing logic may receive random values from a random number generator (block 320). For example, a device that includes the PUF may further include a random number generator component that generates one or more random values or numbers. The processing logic may subsequently generate code words associated with error correction based on the random values and the target data (block 330). The generated code words may be selected from a code word basis that includes a set of elements (e.g., code words) to be used in an error correction operation. A first portion of the code word basis may be selected based on values of the bits of the target data and a second portion of the code word basis may be selected based on values of the bits of the random values. The code word basis may include a first subset that corresponds to or is equal to a number of bits in the target data and a second subset that corresponds to or is equal to a number of random values that are generated. A particular code word may be selected when a value of a corresponding bit is a '1' and the particular code word may not be selected when the value of the corresponding bit is a '0.' Thus, code words from the first subset may be selected based on corresponding bit values of the target data being a '1' and code words from the second subset may be selected based on corresponding bit values of the random numbers being a '1.'

Referring to FIG. 3A, the processing logic may further perform an exclusive- or (XOR) operation between an output value of the PUF and the code words to generate helper data for the PUF corresponding to the SRAM (block 340). For example, an output value of the PUF may be combined with the generated code words to generate the helper data. Subsequently, the helper data may be stored in a non-volatile memory of the device that includes the PUF.

Figure 3B:
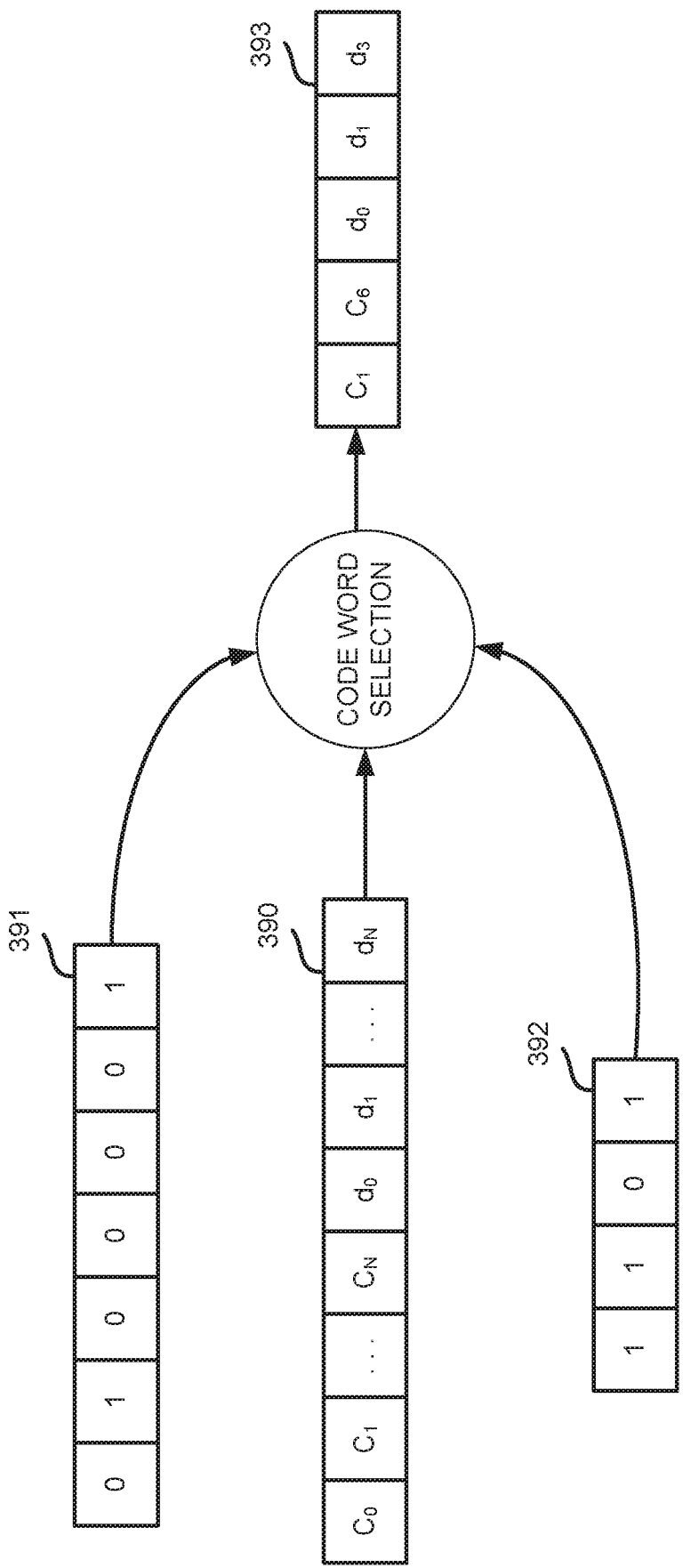
FIG. 3B illustrates the generation of helper data in accordance with some embodiments of the present disclosure.

FIG. 3B illustrates the generation of helper data. In general, the helper data may be generated for the PUF corresponding to an SRAM as described with regards to FIG. 3A. As shown, an available code word basis 390 may be provided. The available code word basis 390 may include multiple code words that may be used in an error correction operation. A target data 391 may also be received and random numbers 392 may be generated. Based on the values of the bits of the target data 391 and the random numbers 392, different code words from the available code word basis 390 may be selected to be used in helper data that is to be generated and used for the error correction operation. For example, the available code word basis 390 may include a code word for each available bit of the target data 391 and a code word for each available bit of the random numbers 392. As shown, since the first bit of the target data 391 is a 0, then the code word $C_0$ may not be used (e.g., a combination of the value of '0' and the code word is zero). Furthermore, since the next bit of the target data 391 is a '1,' then the code word $C_1$ may be used. Based on the values of the remaining bits of the target data 391, the code word $C_6$ may be used and the other code words may not be used (e.g., the seventh bit is a value of '1' and the other bits are at values of '0'). Furthermore, since the random numbers 392 include a value for the first, second, and fourth bits, then the code words $d_0$, $d_1$, and $d_3$ may be used. Thus, the resulting code word basis 393 may include code words $C_1$, $C_6$, $d_0$, $d_1$, and $d_3$. The resulting code word basis 393 may then be combined with an output of the PUF based on an XOR operation to generate the helper data.

Figure 4A:
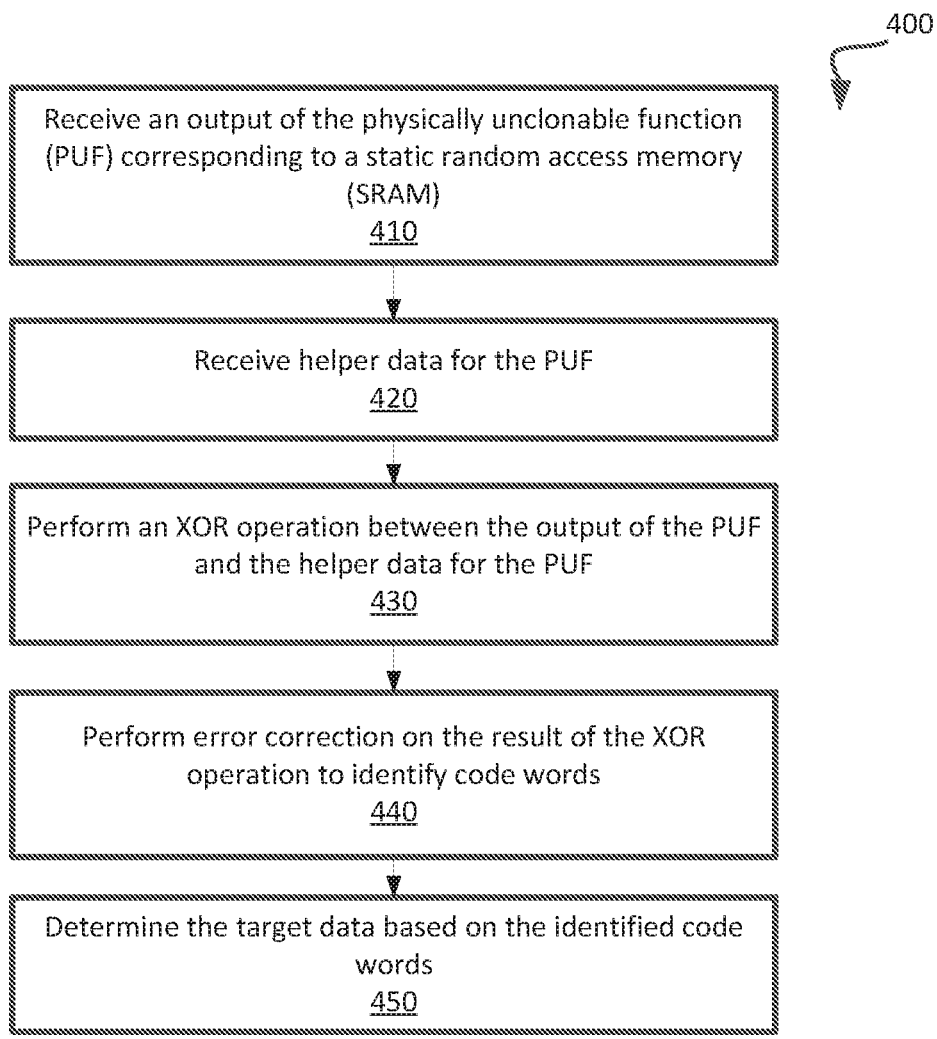
FIG. 4A is a flow diagram of an example method to generate a target data by using a physically unclonable function in accordance with some embodiments of the present disclosure.

FIG. 4A is a flow diagram of an example method 400 to determine a target data by using a physically unclonable function. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the physically unclonable function 110 and/or other device components 130 of the device 100 of FIG. 1.

As shown in FIG. 4A, the method 400 may begin, at block 410, with processing logic receiving an output of a physically unclonable function that corresponds, in this example, to an SRAM. For example, a device component may provide a request for the target data. In some embodiments, the target data may correspond to a cryptographic key to be used by the device component or a value that is used to generate the cryptographic key. The target data may correspond to any other type of secret data to be used by the device component. The processing logic may further receive helper data for the PUF (block 420). For example, the helper data may be retrieved from a non-volatile memory. The processing logic may further perform an XOR operation between the output of the PUF and the helper data for the PUF (block 430). For example, the values corresponding to the physical variations in the PUF and the helper data may be combined to generate a result. Furthermore, the processing logic may perform an error correction on the result of the XOR operation to identify code words (block 440). Since the helper data may be a combination of the code words and a prior output of the PUF when the code words were generated, the result of the XOR operation between the helper data and the output of the PUF may correspond to a combination of the helper data, the prior output of the PUF, and the current output of the PUF. An XOR combination of the prior output of the PUF and the current output of the PUF may be an error term. For example, the error correction operation may remove the error term from the result of the XOR operation (e.g., the combination of the current output of the PUF and the prior output of the PUF) so that result of the error correction operation is the code words. Subsequently, the processing logic may determine the target data based on the identified code words (block 450). The target data may be generated based on which code words have been used. For example, the code words may be decoded to retrieve the original random values that were encoded into the code words. The target data may then be retrieved by reading the first bits (e.g., the first group of bits) of the decoded values which may represent the bits of the original random value that were substituted or replaced by the bits of the target data.

As such, the target data may be generated by performing an error correction operation for a combination of the current output of the PUF and the helper data. The use of the error correction operation may remove an error term from the combination of the current output of the PUF and the helper data to generate the code words that were generated when the target data was received to generate the helper data at a prior time. Subsequently, the code words may be used to determine the target data.

Figure 4B:
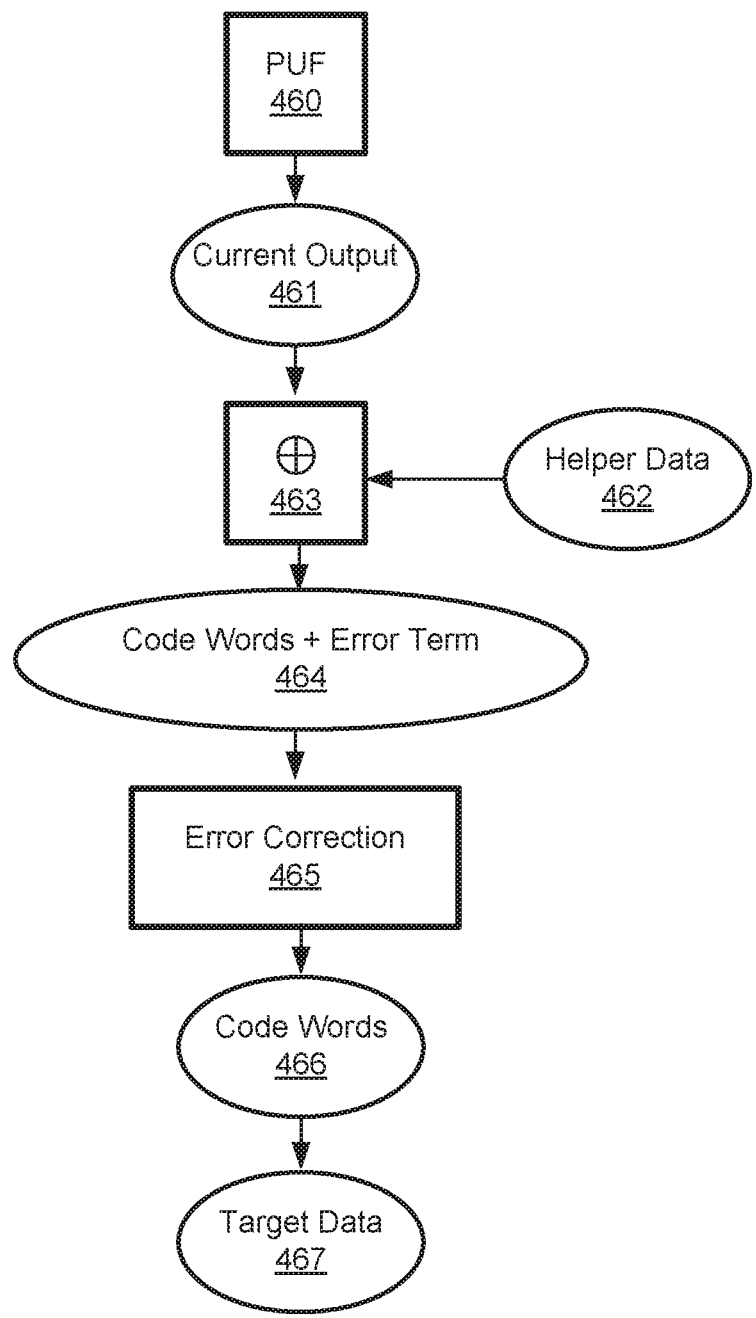
FIG. 4B illustrates the generation of the target data in accordance with some embodiments of the present disclosure.

FIG. 4B illustrates the generation of the target data. In general, the target data may be generated by using the PUF corresponding to an SRAM as described with regards to FIG. 4A. As shown, the PUF 460 may generate a current PUF output 461. Furthermore, the current PUF output 461 and the helper data 462 (e.g., the helper data based on code words and a prior PUF output as described with respect to FIGS. 3A and 3B) may be combined based on an XOR operation to generate a result data 464. In some embodiments, the result data 464 may be a value that corresponds to an error term (e.g., the prior PUF output and the current PUF output) and the code words that were previously selected or generated based on the values of the target data and the random numbers. For example, the result data 464 may be an XOR combination of the current PUF output 461, code words, and the prior PUF output when the code words were selected. The XOR combination of the current PUF output 461 and the prior PUF output may correspond to an error term. The error correction operation 465 may be performed on the result data 464 to remove the error term (e.g., the XOR combination of the current PUF output 461 and the prior PUF output) so that the code words 466 are remaining. Subsequently, the target data 467 may be derived from the code words 466.

In some embodiments, the physical variation of the PUF may correspond to differences in a resistance between a pair of nominally identical resistors. For example, a value of '0' may be assigned to a pair of resistors when the difference in resistance between the first and second resistor (i.e., due to random variation incurred during manufacturing) is larger than a predetermined threshold value and a value of '1' may be assigned to the pair of resistors when the difference in resistance between the first and second resistor is smaller than a predetermined threshold value. In some embodiments, if the difference in resistance between the pair of resistors does not exceed either of the threshold values that correspond to the values of '0' and '1' then the particular pair of resistors may not be used in the determination of the value of the PUF. In such an example, the helper data may identify pairs of resistors where the difference in resistance of the corresponding pairs is sufficiently large to be usable to determine a value of '0' or '1' from the pairs of resistors. The helper data may further identify an ordering of the values associated with the pairs of resistors that are used to determine the target data. In the same or alternative embodiments, the physical variation of the PUF may correspond to a race condition between two signal paths. For example, a value of '0' may be assigned if a first path satisfies the race condition before the second path and a value of '1' may be assigned if the second path satisfies the race condition before the first path. In such an example, the helper data may identify pairs of the paths that may be used to generate the target data.

In some embodiments, the helper data may be a value that represents a combination between a first output value of the PUF and a code word. The code word may be generated by using bits of the target data. In some embodiments, the value may be an exclusive-or (XOR) combination of the first output value of the PUF and the code word. The code word may then be recovered by using the helper data with an output of a second fuzzy reading (i.e., a reading which includes some bits that are unstable and can vary between subsequent readings) of the PUF and then performing an error correction on the result to remove the error term. The target data may then be recovered from the resulting code word.

Figure 5:
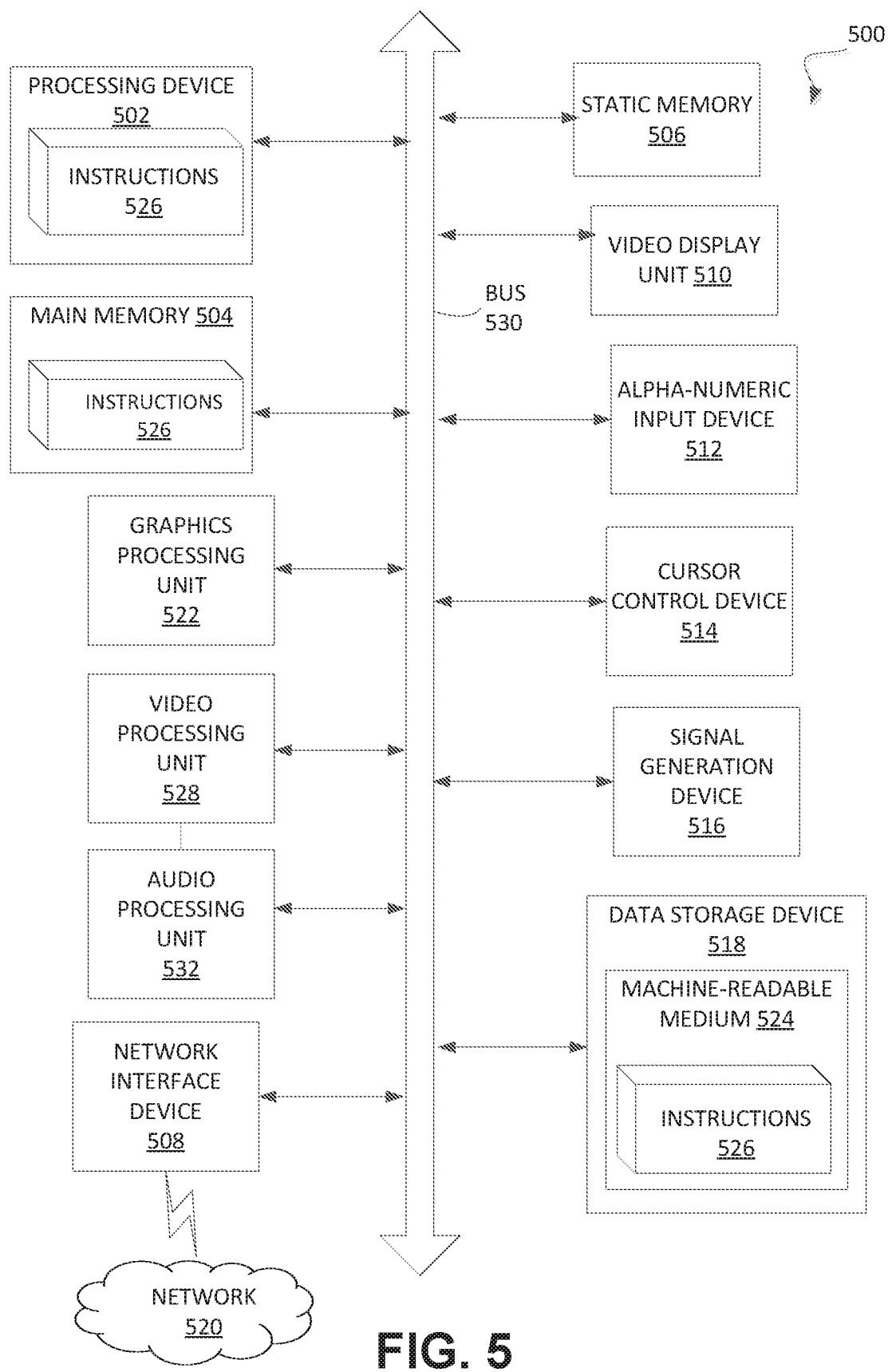
FIG. 5 illustrates a block diagram of an embodiment of a computer system in which some embodiments of the disclosure may operate.

FIG. 5 illustrates an example of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 614 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality as described herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, the present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving a value corresponding to a physical variation of a device, wherein the value corresponding to the physical variation of the device is associated with an output of a physically unclonable function (PUF);
receiving helper data associated with the physical variation of the device, wherein the helper data is derived by the PUF using an input target data;
generating a result data based on a combination of the value corresponding to the physical variation of the device and the helper data;

performing, by a processing device, an error correction operation on the result data to identify one or more code words associated with the error correction operation; and generating a target data based on the one or more code words, wherein the input target data matches the target data.

2. The method of claim 1, wherein the target data is further generated based on the output of the PUF and the helper data.

3. The method of claim 1, further comprising:
storing the helper data at a memory of the device; and
retrieving the helper data from the memory in response to a request to generate the target data.

4. The method of claim 1, wherein the result data corresponds to the identified one or more code words and an error term, wherein the error term corresponds to a prior output of the physical variation of the device and the value corresponding to the physical variation of the device.

5. The method of claim 4, wherein performing the error correction operation on the result data removes the error term from the result data.

6. A system comprising:
a memory; and
a processing device, operatively coupled with the memory, to:
receive a value corresponding to a physical variation of a device, wherein the value corresponding to the physical variation of the device is associated with an output of a physically unclonable function (PUF);
receive helper data associated with the physical variation of the device, wherein the helper data is derived by the PUF using an input target data;
generate a result data based on a combination of the value corresponding to the physical variation of the device and the helper data;
perform an error correction operation on the result data to identify one or more code words associated with the error correction operation; and
generate a target data based on the one or more code words, wherein the input target data matches the target data.

7. The system of claim 6, wherein the target data is further generated based on the output of the PUF and the helper data.

8. The system of claim 6, wherein the processing device is further to:
store the helper data at a memory of the device; and
retrieve the helper data from the memory in response to a request to generate the target data.

9. The system of claim 6, wherein the result data corresponds to the identified one or more code words and an error term, wherein the error term corresponds to a prior output of the physical variation of the device and the value corresponding to the physical variation of the device.

10. The system of claim 9, wherein performing the error correction operation on the result data removes the error term from the result data.

11. A non-transitory computer readable medium comprising instructions that, when executed by a processing device, cause the processing device to perform operations comprising:
receiving a value corresponding to a physical variation of a device, wherein the value corresponding to the physical variation of the device is associated with an output of a physically unclonable function (PUF);
receiving helper data associated with the physical variation of the device, wherein the helper data is derived by the PUF using an input target data;
generating a result data based on a combination of the value corresponding to the physical variation of the device and the helper data;
performing an error correction operation on the result data to identify one or more code words associated with the error correction operation; and
generating a target data based on the one or more code words, wherein the input target data matches the target data.

12. The non-transitory computer readable medium of claim 11, wherein the target data is further generated based on the output of the PUF and the helper data.

13. The non-transitory computer readable medium of claim 11, wherein the result data corresponds to the identified one or more code words and an error term, wherein the error term corresponds to a prior output of the physical variation of the device and the value corresponding to the physical variation of the device.

14. The non-transitory computer readable medium of claim 13, wherein performing the error correction operation on the result data removes the error term from the result data.

15. A method comprising:
identifying a target data;
identifying pairs of resistors of a device;
receiving a plurality of values associated with the pairs of resistors of the device, wherein a particular value of the plurality of values is based on a difference in resistance between two resistors of the pairs of resistors of the device; and
generating, by a processing device, helper data using the target data and the plurality of values associated with the pairs of resistors of the device, wherein the helper data is used to generate an additional target data, and wherein the additional target data matches the target data.

16. The method of claim 15, wherein generating the helper data based on the target data and the plurality of values associated with the pairs of resistors of the device comprises:
identifying a subset of the plurality of values that matches bits of the target data, the helper data identifying the pairs of resistors of the device that are associated with the subset of the plurality of values.

17. The method of claim 16, wherein the helper data further specifies an ordering of the subset of the plurality of values that match the bits of the target data.

18. The method of claim 15, wherein the plurality of values associated with the pairs of resistors of the device correspond to physical variations of the pairs of resistors, and wherein the method further comprises:
generating one or more code words based on the plurality of values and the target data; and wherein the generating the helper data comprises
generating the helper data based on the plurality of values, the target data, and the one or more code words.

19. The method of claim 18, wherein the generating of the helper data is based on an exclusive-or (XOR) operation.

20. The method of claim 15, wherein each of the plurality of values corresponds to a difference in resistance between two respective resistors of the pairs of resistors.

* * * * *